United States Patent [19]
Takata

[11] Patent Number: 5,924,511
[45] Date of Patent: Jul. 20, 1999

[54] CONTROL FOR ELECTRIC POWER ASSISTED VEHICLE

[75] Inventor: Nozomu Takata, Iwata, Japan

[73] Assignee: Yamaha Hatsudoki Kabushiki Kaisha, Iwata, Japan

[21] Appl. No.: 08/794,416

[22] Filed: Feb. 5, 1997

[30] Foreign Application Priority Data

Feb. 13, 1996 [JP] Japan ................................. 8-025683

[51] Int. Cl.⁶ ........................................................ B63K 11/00
[52] U.S. Cl. ................................................................ 180/205
[58] Field of Search ...................................... 180/205–207, 180/65.1, 65.2, 214, 216, 219, 220, 19.1–19.3; 310/152, 154; 280/212, 214; 318/139, 449, 452

[56] References Cited

U.S. PATENT DOCUMENTS

| | | | |
|---|---|---|---|
| 3,820,000 | 6/1974 | Smith | 320/2 |
| 3,855,511 | 12/1974 | Smith | 318/317 |
| 3,867,679 | 2/1975 | Smith | 318/542 |
| 3,921,745 | 11/1975 | McCulloch | 180/220 |
| 5,226,501 | 7/1993 | Takata | 180/220 |
| 5,474,148 | 12/1995 | Takata | 180/207 |

*Primary Examiner*—Robert J. Oberleitner
*Assistant Examiner*—C. T. Bartz
*Attorney, Agent, or Firm*—Knobbe, Martens, Olson & Bear LLP

[57] ABSTRACT

A power assisted manually operated vehicle wherein the power assist is capable of providing different power and speed curves depending upon the operating condition. The operator may also select one of these conditions for manual operation such as to obtain an assist when pushing the vehicle. The variable speed and power curves are obtained with a permanent magnet electric motor with the variations being obtained by varying the field strength of the permanent magnet through an augmenting coil.

22 Claims, 5 Drawing Sheets

CONTROL FOR ELECTRIC POWER ASSISTED VEHICLE

BACKGROUND OF THE INVENTION

This invention relates to a power assisted vehicle and more particularly to a power assisted that is capable of operating in significantly different modes.

There have been proposed a wide variety of types of manually powered vehicles. A number of these vehicles also offer the option of power assist. In some vehicles the power assist is of a type where the prime mover provides the substantial motive force for the vehicle under at least certain operator selected conditions. Another type of power assisted vehicle, and one which has great popularity, is one wherein the amount of power assist is tailored to the operator's manual input force. As a result of this, the power assist generally does not provide the sole mode of power for the vehicle. Rather, the vehicle maintains its manually operated feel but the load on the operator is reduced because the power assist is proportional to the operator input force.

With this latter type of vehicle, there may still be some times when the power assist in combination with the manual force input is not sufficient to propel the vehicle. For example, in bicycles or other land vehicles, they may be some hills that are so steep that the rider cannot, even with power assist, pedal up them. In these instances, or under other circumstances, the rider may wish to walk alongside of the vehicle or behind it and push it. However, under these circumstances, the power assist mechanism can actually make pushing of the vehicle more difficult than if no power assist would be provided.

There have been proposed ways wherein the pushing of the vehicle will in essence disable the power assist mechanism so that the operator need not drive the prime mover of the power assist mechanism when he is pushing the vehicle. There have also been proposed systems wherein the operator may switch on the power assist when pushing so as to augment his manual force to assist in pushing of the vehicle. Such an arrangement is shown in my U.S. Pat. No. 5,226,501 issued Jul. 13, 1993, entitled Electric-Motored Bicycle, assigned to the assignee hereof.

Although this type of arrangement has a number of advantages, the characteristics of the motor chosen for the power assist is such that it is not particularly efficient under low speeds and when high torque is required. The basic motor is designed so as to operate at higher speeds and hence is not efficient and does not generate large amounts of torque under this low speed pushing condition. Thus, the assist is not as great as desired and furthermore operation in this mode can deplete the power of the battery.

It is, therefore, a principal object of this invention to provide an improved propulsion system for a primarily manually-powered vehicle wherein the characteristics of the power assist can be changed manually or automatically to suit specific running conditions.

It is a further object of this invention to provide an improved electric motor assist for a manually operated vehicle wherein the electric motor is capable of operating in different modes in response to different conditions.

It is a still further object of this invention to provide an electric motor power assisted vehicle wherein the electric motor is capable of operating in at least two different modes which can be selected either manually or automatically to provide optimum running under all conditions and also insure long battery life.

SUMMARY OF THE INVENTION

This invention is adapted to be embodied in a power assisted vehicle that is comprised of a body forming a rider's area. A manually operated device is incorporated in the body for receiving a manual force from a rider in the rider's area. A propulsion device is provided for propelling the vehicle. A transmission transmits power from the manually operated device to the propulsion device for manual propulsion of the vehicle. A prime mover system is also provided for powering the propulsion device for at least power assist to the propulsion of the vehicle. The prime mover system is capable of operating in at least two operating modes that provide different power and speed curves from its output. Control means sense the operating condition of the vehicle and the rider's manual force application to the manually operated device for both selecting the amount of power assist from the prime mover system and also its operational mode.

DETAILED DESCRIPTION OF THE PREFERRED EMBODIMENTS OF THE INVENTION

Figure 1:
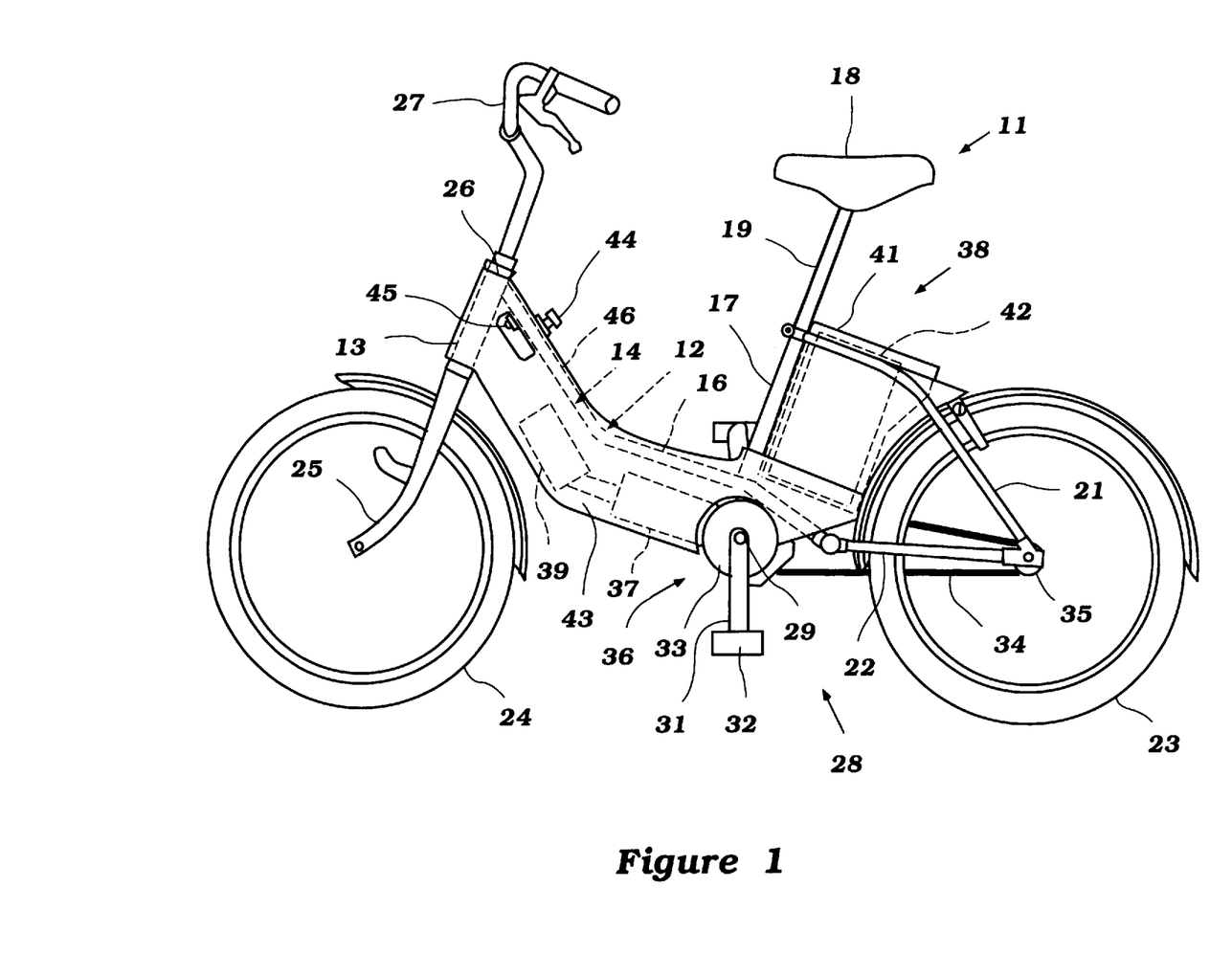
FIG. 1 is a side elevational view of an electric motor power assisted bicycle constructed and operated in accordance with an embodiment of the invention.

Referring now in detail to the drawings and initially to FIG. 1, an electric power assisted vehicle is shown in FIG. 1 and is identified generally by the reference numeral 11. The illustrated vehicle 11 comprises a bicycle. Although this type of vehicle has been illustrated and will be described, it will be readily apparent to those skilled in the art how the invention can be applied with various types of electric power assisted, manually operated vehicles. A bicycle is just one of many types of vehicles with which certain facets of the invention may be utilized. The invention, however, does have particular utility in conjunction with electric power assisted bicycles.

The construction of the bicycle 11 will be described only generally inasmuch as the invention deals primarily with the electric assist motor and control strategy and for the bicycle 11. Where any details of the construction of the bicycle 11 are not illustrated or described, reference may be had to U.S. Pat. No. 5,570,752 issued Nov. 5, 1996 in the name of Nozomo Takata, entitled "Transmission Arrangement for Electric Power Assisted Bicycle," assigned to the assignee hereof for details of constructions with which the invention may be used. Also, reference may be had to other prior art structures including my aforenoted patent for certain details of the bicycle 11 where those details are not shown because they are not critical to the practicing of the invention.

The bicycle 11 is comprised of a frame assembly, indicated generally by the reference numeral 12, which is comprised of a head pipe 13, a main tube 14 having a first portion 15 that extends rearwardly and downwardly from the head pipe 13 and a more horizontally-extending but still downwardly inclined rear portion 16. A seat post 17 is affixed to the rearwardly extending portion 16 of the main tube 14. A seat 18 is adjustably supported on the seat post 17 by means of a connecting pipe 19.

The frame further includes a rear wheel support consisting of a back stay 21 and a rear fork 22. A rear wheel 23 is rotatably journaled by the back stay 21 and fork 22 at the rear thereof.

A front wheel 24 is dirigibly supported by a front fork 25 and bearing assembly 26 carried by the head pipe 13. A handlebar 27 is disposed adjustably to the front fork 25 forwardly of the seat 18 for steering of the front wheel 24 in a known manner.

At the base of the seat post 17, there is provided a manual power input mechanism in the form of a pedal operated crank, indicated generally by the reference numeral 28. This pedal operated crank includes a crankshaft 29 that is pivotally supported on the frame assembly 12 in a suitable manner, for example, as disclosed in the aforenoted U.S. Pat. No. 5,570,752. The pedal mechanism 28 includes crank arms 31 that are fixed to the opposite ends of the crankshaft 29 and which pivotally carry pedals 32 at their outer extremities so as to permit the rider's feet to turn the crankshaft 29 in a well-known manner.

A transmission mechanism, shown partially and indicated by the reference numeral 33 of any suitable type drives a chain 34. The chain 34, in turn, drives a sprocket 35 for driving the rear wheel 23 in a well-known manner.

In addition to the manual power mechanism 28 there is provided an electric power assist mechanism, indicated generally by the reference numeral 36. This electric power assist mechanism includes an electric motor 37 of a type embodying an important feature of the invention and which drives the transmission 33 through a one-way clutch mechanism which may be of the type also shown in the aforenoted U.S. Pat. No. 5,570,752.

Figure 2:
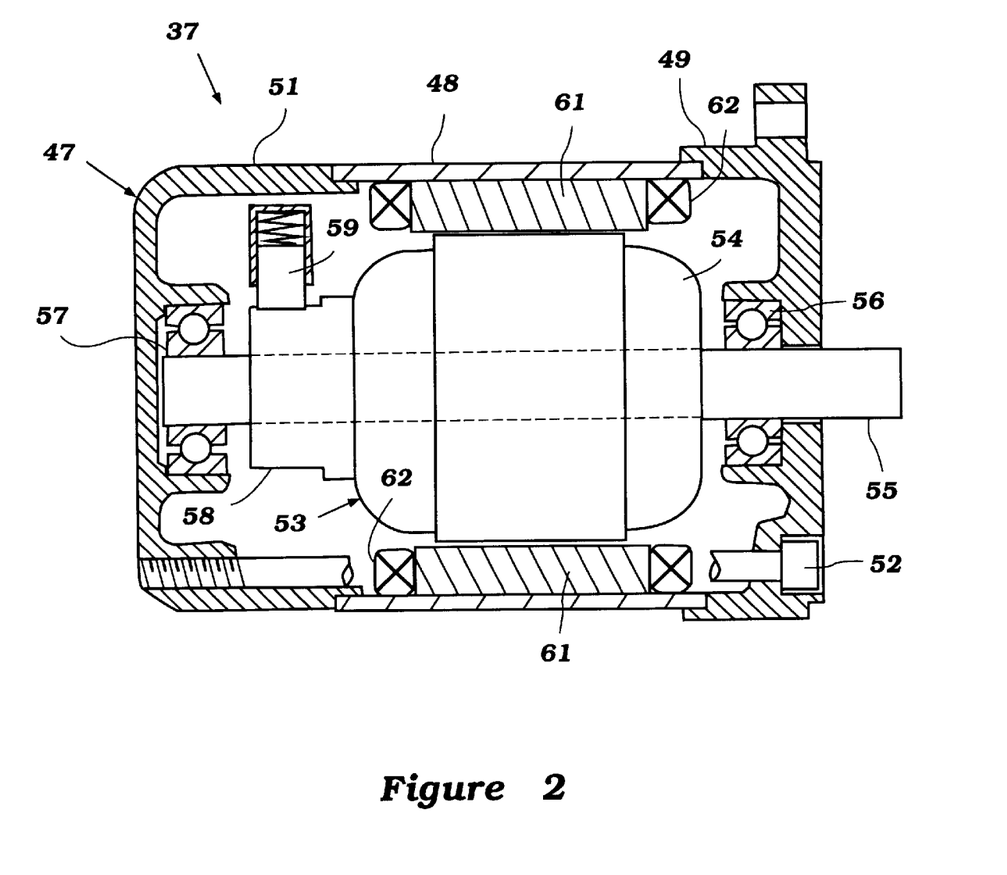
FIG. 2 is enlarged cross-sectional view taken through the electric motor of the power assist for the bicycle.

This electric motor 37 has a construction as best seen in FIG. 2 and will be described in more detail later by reference to that figure. The motor 37 is supplied with electrical power from an electrical power source, indicated generally by the reference numeral 38 under the operation of a controller, shown schematically and indicated at 39. The control strategy will be described later by reference to FIGS. 3 through 5.

The electrical power source 38 includes a battery case 41 which contains an electrical storage battery 42, preferably of the rechargeable type. The battery 42 may be either charged in the bicycle 11 or may be removed for external charging. The battery 42 can be removed from the case 41 from between the back stays 21.

A body, indicated generally at 43 encircles a portion of the frame assembly 12. In a recess 44 provided in the forward portion of the body 43. This recess 44 affords access to a self-propelling switch 45 for a purpose that will be described. Basically the self-propelled control 45 is utilized when the rider is not riding the bicycle 11 but rather is walking along side of it and is pushing it up a hill. This self-propel mechanism controlled by the switch 45 permits the motor 37 to be energized in a specific state under these circumstances. A main switch 46 is mounted adjacent the recess 44 for turning on or off the main electrical power assist.

The control 39 controls the electric motor 37 to provide power assist when the bicycle is being pedaled by the manual pedal mechanism 28. Any known type of control strategy can be employed for the normal pedal operation. In accordance with these control strategies a torque sensor (not shown) is associated with the manual mechanism 28 so as to sense the manual input force. Also a speed sensor which is also not shown provides signals representative of vehicle speed to the controller 39. An electric power assist is then provided by the motor 37 under the operation of the controller 39 so as to provide a proportional assist to the operator's manual input and appropriate for the vehicle speed.

Figure 3:
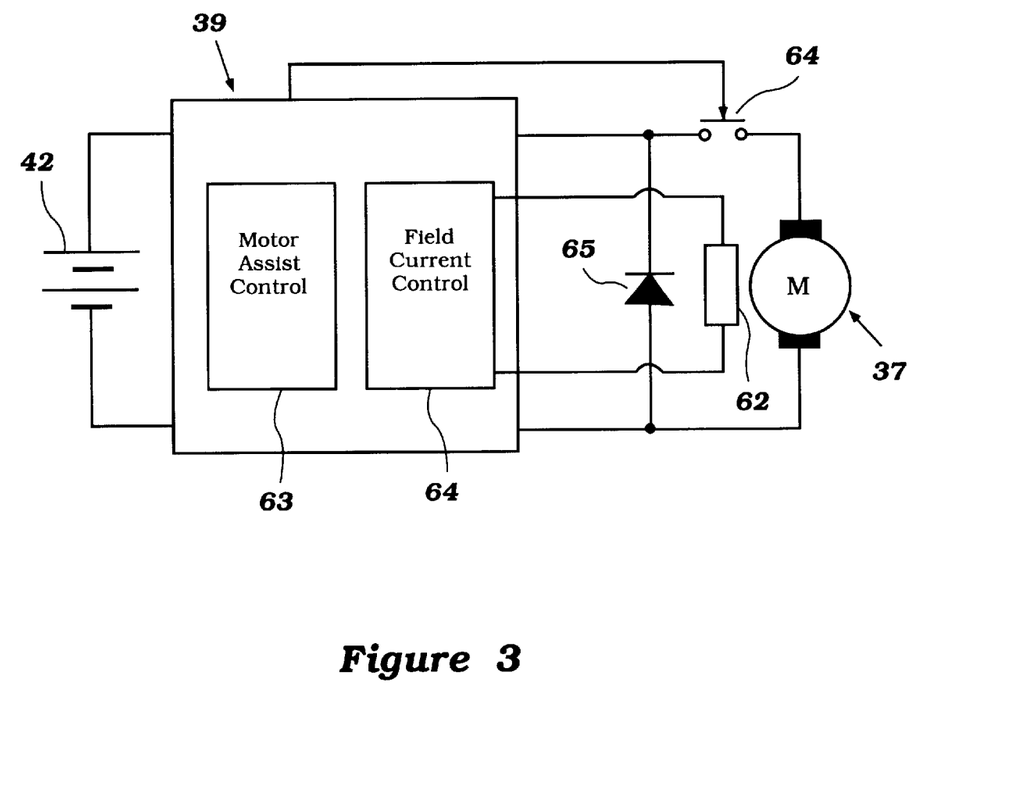
FIG. 3 is a schematic electrical diagram showing the electric motor control.

In accordance with an important feature of the invention, the motor 37 is constructed so as to have different operating characteristics or modes and this construction and the circuitry associated with it will be described shortly by reference to FIGS. 2 and 3.

The construction of the electric motor 37 will now be described by principal reference initially to FIG. 2. The electric motor 37 is comprised of an outer housing assembly, indicated generally by the reference numeral 47 which is comprised of a central shell 48 and a pair of end caps 49 and 51. These elements are held together by a plurality of fasteners 52, only one of which appears in the drawings.

The motor 37 is of the permanent magnet field type that operates on direct current. Therefore the motor 47 is provided with a rotor 53 that has windings of an armature coil that is wound upon a core 54 thereof. This core 54 is affixed to a shaft 55 that is journaled within the housing 47 by bearings 56 and 57. The bearings 56 and 57 are carried by the end caps 49 and 51.

Electric current is supplied to these core windings via a commutator 58 which is in circuit with the windings in a well known manner. A spring biased brush 59 transmits the electrical power from the battery 42 to the commutator 58 also in a well known manner.

Annular permanent magnet assembly 61, indicated generally by the reference numeral 59 is mounted on the shell 48 in surrounding relationship to the armature 54 and specifically the windings thereof. The north and south poles of the permanent magnet 59 are associated with the windings so as to effect rotation of the motor when electric current is applied to the windings through the brush 59. As thus far described, the electric motor 37 is conventional.

However, in accordance with the invention, an arrangement is provided so that the motor 37 can be controlled in such a way as to change its basic characteristics. By doing this, the motor 37 can have its operation tailored to certain specific running conditions, as will be described, so as to permit the motor to operate as a high torque, low speed motor under some conditions and as a low torque, high speed motor under other conditions. In this way, the power assist can be improved without deteriorating from the life of the battery 42 and without requiring expensive controls and/or circuitry.

To this end, there is provided a further series of coils 62 that are disposed at the pole ends of the permanent magnet 61 and which can be energized in a manner to be described so as to either increase or decrease the magnetic field provided by the permanent magnet 61. In this way, the actual performance characteristics of the electric motor 37 can be changed without changing the voltage impressed upon it or without requiring complicated circuitry.

Control circuit arrangement for controlling both the armature of the motor 37 and the magnetic field strength changing winding 62 will be described by reference to FIG. 3. As seen in this figure, the controller 39 includes two main control sections. The first of these is the motor assist control 63 which, generally, operates as a conventional control. This controls the amount of voltage or current supplied to the motor 37 and specifically to which the windings of the armature 53 via a controlling switch 64. This control may control, for example, the duty cycle of the motor 37 so as to control the power assist.

In addition, there is provided a field circuit control section 64 which controls the field current supplied to the windings 62 so as to either increase or decrease the magnetic field strength provided by the permanent magnet 61.

A flywheel diode 65 is placed across the circuits to the armature 53 so as to control the counter emf force of the motor 37.

Figure 5:
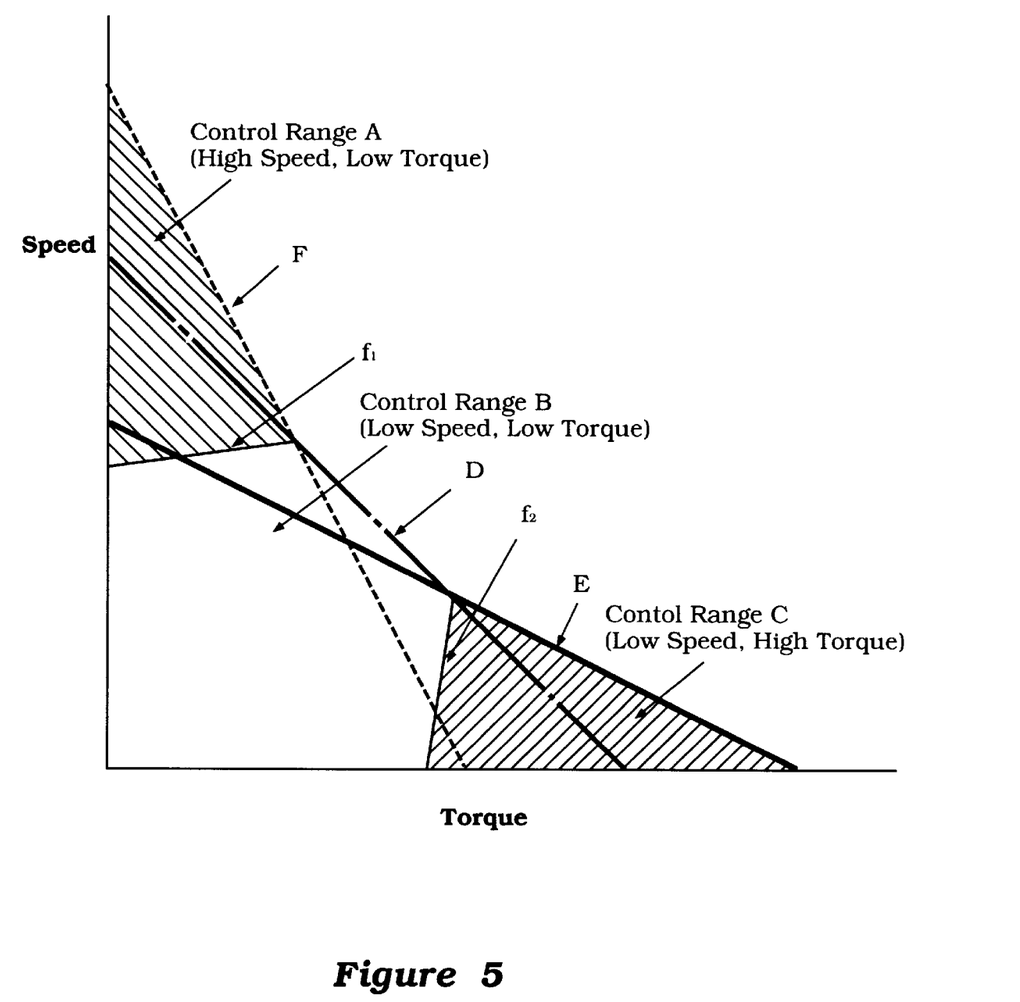
FIG. 5 is a graphical view showing the relationship of speed to torque and the various control ranges in which the invention is utilized and the performance mode characteristics of the electric motor in these control ranges.

The control for the field current provided by the control section 64 operations generally in three phases as seen in FIG. 5. There is a first control range A delimited by the line $f_1$ which is the control that is impressed when the bicycle is traveling at a high speed and a low torque is required. At this time the motor 37 is configured so as to provide a high speed low torque operation. This is accomplished by providing a negative effect in the winding 62 so as to actually decrease the field strength of the permanent magnet 61.

The control range indicated at B is the normal control range when operating at low speed and low torque. This is primarily a normal pedaling operation. Under this condition, the electric motor is operated basically so as to function in its normal state and there is no current applied to the windings 62. Hence the strength of the magnetic field provided by the magnet 61 is not changed.

The final control range C delimited by the line $f_2$ is the condition when operating at a low speed and a high torque. This may occur when pedaling uphill or when the operator is actually pushing the bicycle uphill and calls for assist by operating the self-propel switch 45. Under this condition, the magnetic field provided by the permanent magnet 61 is increased by providing a current flow through the coils 62 that adds to the strength of the magnetic field.

Figure 4:
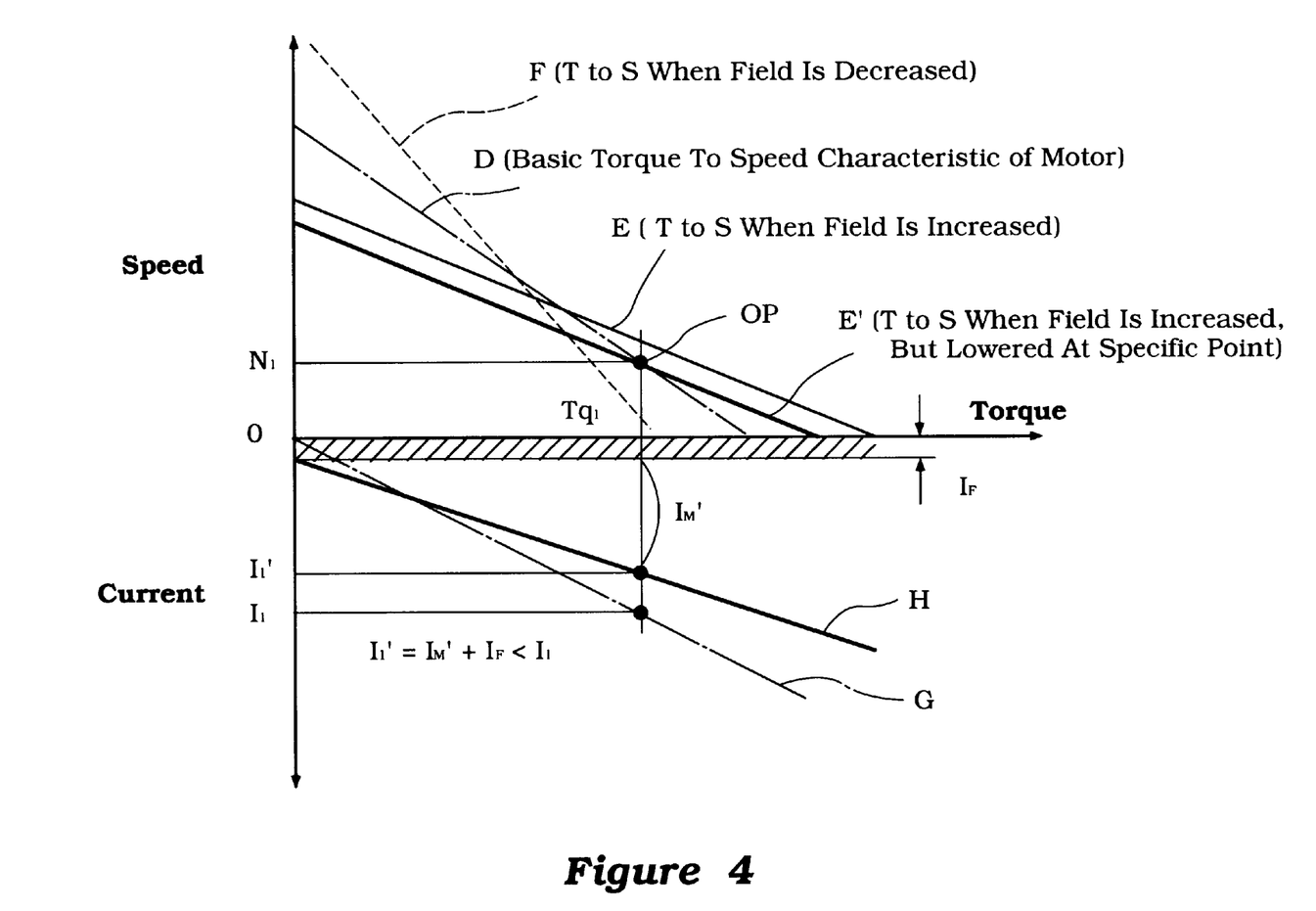
FIG. 4 is a graphical view showing the speed and current in relation to torque in connection with the motor control and shows the varying characteristics that are possible for the motor operation mode.

The performance of the electric motor 37 can be understood by reference to FIG. 4. In FIG. 4, the motor characteristics of the motor 37 when the magnetic field provided by the permanent magnet 61 is neither augmented nor decreased through the use of the winding 62 is indicated at the dot dash curve D. This shows the basic characteristics of the motor 37 and specifically those of a type normally used by this type of vehicle application. The solid line curve E shows the characteristics of the motor when the magnetic field of the permanent magnet 61 is intensified by causing a current flow through the coils 62. It will be seen that under this condition the high speed torque performance of the motor 37 is decreased but the torque under low speeds is substantially increased.

The broken line curve F shows the characteristics of the motor in respect to torque and speed when the magnetic field is decreased by the effect of the coils 62 which are activated in such a way as to decrease the magnetic field. As may be seen, this causes the motor to operate at a higher speed but also to have the torque fall off more rapidly than the conventional basic curve D. Thus, by lowering the magnetic field under the high speed low torque requirement state through the appropriate activation of the coil 62, it is possible to obtain an increase in energy efficiency at the same speed of rotation of the motor and hence assist may be provided at a higher speed. Hence, when the vehicle is being operated in the control range A, the windings 62 are energized so as to decrease the magnetic field and have the motor 37 function as a high speed low torque motor. However, when operating in the control range C, the magnetic field is increased causing a current to flow in the appropriate direction to the winding 62 so as to have the motor operate as a low speed high torque motor having the characteristics shown at E.

When operating under this latter condition, for example, as pushing the bicycle up a hill it is possible to obtain still further increases in efficiency and reduce the current flow. Referring to FIG. 4, it is also seen that the actual electrical consumption in the term of current flow can be reduced at a given operational point OP where the speed is relatively low at $N_1$ but wherein a moderately high torque $Tq_1$ is required.

As may be seen, in order to achieve this torque, the current flow of the motor 37 without augmenting the magnetic field provided by the permanent magnet 61 is in accordance with the curve G. However, at the same point it is possible to tailor the curve E when the field is increased by decreasing the amount of field increase so as to provide the Curve E' so that the performance is the same as if the current augmentation were not employed. However, under this condition the actual current utilized by the motor $I_1$ 'is less than the current supplied under the standard motor operation and this current flow is equal to the sum of the current flow IM' plus IF, these being the current flows employed for the motor winding and for the control winding 62. Thus, electric power consumption can be decreased and performance increased when pushing up a hill and operating the self-propelled switch 45.

Thus, it should be readily apparent from the foregoing descriptions that the described embodiment of the invention provides a wider latitude in the functional operation of the electric motor without requiring complicated systems. Thus, the motor performance can be tailored to the desired performance while at the same time saving electrical consumption and providing better overall performance. Although this is preferably accomplished with an electric motor as the motor 37, other ways of obtaining variable speed and torque curves may be employed. Such may include the use of variable transmissions, separate motors having different characteristics or the like. The motor 37 however has the advantage of lower cost and more simplified control.

Of course, the foregoing description is that of preferred embodiments of the invention, and various changes and modifications may be made without departing from the spirit and scope of the invention, as defined by the appended claims.

What is claimed is:

1. A power assisted vehicle comprising a body forming a rider's area, a manually operated device for receiving a manual force from a rider in said rider's area, a propulsion device for propelling said vehicle, a transmission for transmitting power from said manually operated device to said propulsion device for manual propulsion of said vehicle, a prime mover system for providing power to said propulsion device for at least power assist to the propulsion of said vehicle, said prime mover system including a prime mover that is controllable between at least two different operational drive modes each of which has a different power and speed output curve so that at a given prime mover speed different power will be developed by said prime mover for driving said, and control means for sensing an operating condition of said vehicle and the rider's manual force application to said manually operated device for selecting both the amount of power assist supplied by said prime mover and its operational drive mode.

2. A power assisted vehicle comprising a body forming a rider's area, a manually operated device for receiving a manual force from a rider in said rider's area, a propulsion device for propelling said vehicle, a transmission for transmitting power from said manually operated device to said propulsion device for manual propulsion of said vehicle, a prime mover system for providing power to said propulsion device for at least power assist to the propulsion of said vehicle, said prime mover system including a prime mover that is controllable between at least two different operational modes each of which has a different power and speed output curve so that at a given prime mover speed a different power will be developed by said prime mover, control means for sensing the operating condition of said vehicle and the rider's manual force application to said manually operated device for selecting both the amount of power assist supplied by said prime mover and its operational mode, and manually operated control means for selecting the operational drive mode of said prime mover by the operator and independently of said control means.

3. A power assisted vehicle as set forth in claim 2, wherein the operator can manually select a specific one of the operating modes.

4. A power assisted vehicle as set forth in claim 3, wherein the one operating mode which the operator can manually select is a low speed, high torque operating mode.

5. A power assisted vehicle as set forth in claim 1, wherein one of the operating modes is a high torque, low speed curve.

6. A power assisted vehicle as set forth in claim 5, wherein an other operating mode is comprised of a low torque, high speed curve.

7. A power assisted vehicle as set forth in claim 6, wherein the prime mover system is comprised of a single prime mover.

8. A power assisted vehicle as set forth in claim 7, wherein the single prime mover comprises an electric motor.

9. A power assisted vehicle as set forth in claim 8, wherein the electric motor is a direct current motor embodying a permanent magnet stator.

10. A power assisted vehicle as set forth in claim 9, wherein the different operating modes are achieved by changing the magnetic flux generated by the permanent magnet.

11. A power assisted vehicle as set forth in claim 10, wherein the magnetic flux is changed by providing an electrically operated coil that is associated with the permanent magnet for changing the strength of the flux.

12. A power assisted vehicle as set forth in claim 6, further including manually operated control means for selecting the operational mode of the prime mover by the operator and independently of the control means.

13. A power assisted vehicle as set forth in claim 12, wherein the operator can manually select a specific one of the operating modes.

14. A power assisted vehicle as set forth in claim 13, wherein the one operating mode which the operator can manually select is a low speed, high torque operating mode.

15. A power assisted vehicle as set forth in claim 1, wherein the single prime mover comprises an electric motor.

16. A power assisted vehicle as set forth in claim 15, wherein the electric motor is a direct current motor embodying a permanent magnet stator.

17. A power assisted vehicle as set forth in claim 16, wherein the different operating modes are achieved by changing the magnetic flux generated by the permanent magnet.

18. A power assisted vehicle as set forth in claim 17, wherein the magnetic flux is changed by providing an electrically operated coil that is associated with the permanent magnet for changing the strength of the flux.

19. A power assisted vehicle as set forth in claim 1, wherein the vehicle is a land vehicle and the propulsion device comprises a wheel.

20. A power assisted vehicle as set forth in claim 19, wherein the manually operated device comprises a pedal mechanism.

21. A power assisted vehicle as set forth in claim 20, wherein the vehicle has at least two wheels and one of the wheels is dirigible.

22. A power assisted vehicle as set forth in claim 21, wherein the vehicle comprises a bicycle having a single dirigible front wheel and a driven rear wheel.

* * * * *

UNITED STATES PATENT AND TRADEMARK OFFICE
CERTIFICATE OF CORRECTION

PATENT NO. : 5,924,511
DATED : July 20, 1999
INVENTOR(S) : Takata

It is certified that error appears in the above-identified patent and that said Letters Patent is hereby corrected as shown below:

<u>Column 6, claim 1,</u>
Line 60, please delete -- driving said, and -- and replace with -- driving said vehicle, and --

Signed and Sealed this

Eleventh Day of December, 2001

Attest:

NICHOLAS P. GODICI
*Attesting Officer*   *Acting Director of the United States Patent and Trademark Office*